April 23, 1946.　　　U. H. CARR　　　2,399,100
LOW ALTITUDE PARACHUTE
Filed June 21, 1944　　　2 Sheets-Sheet 1
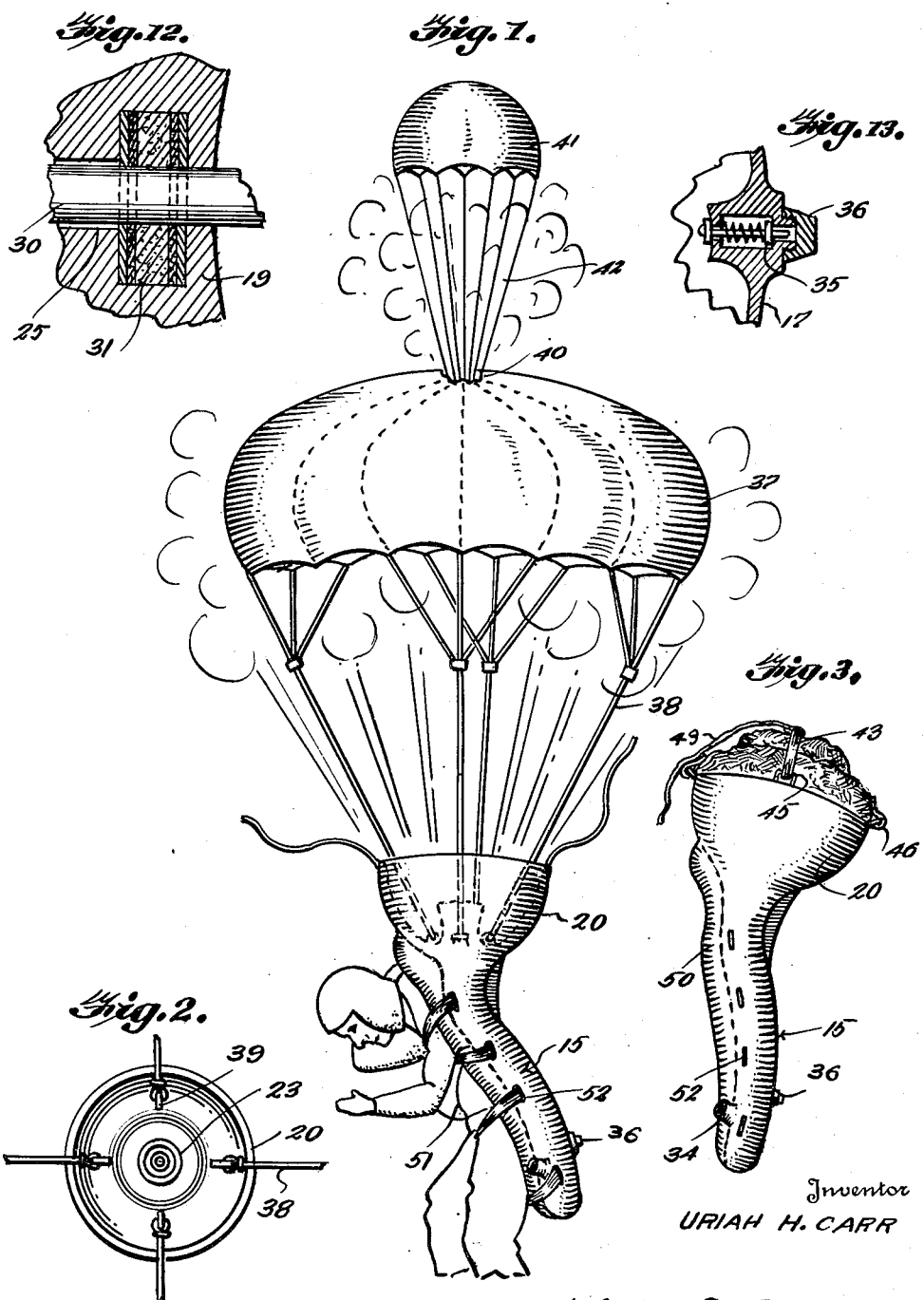
Inventor
URIAH H. CARR
By Kimmel & Crowell
Attorneys

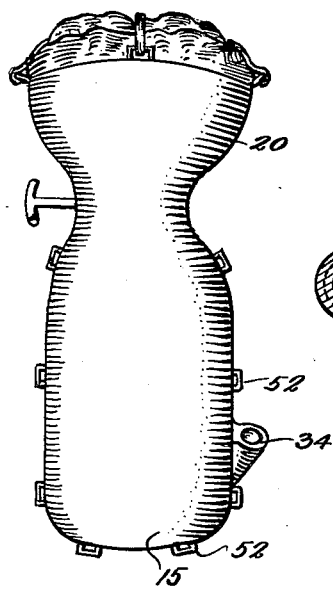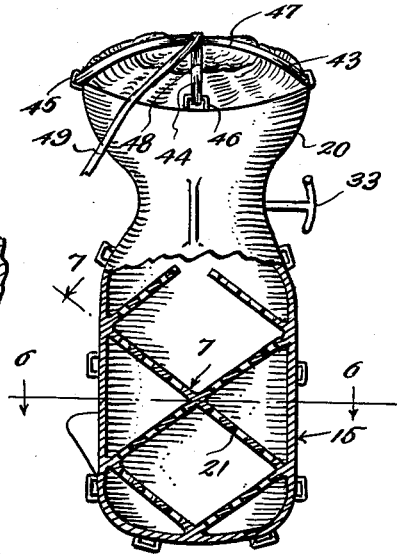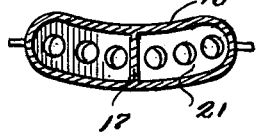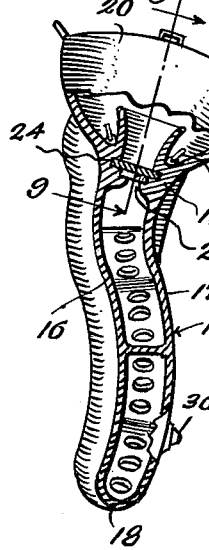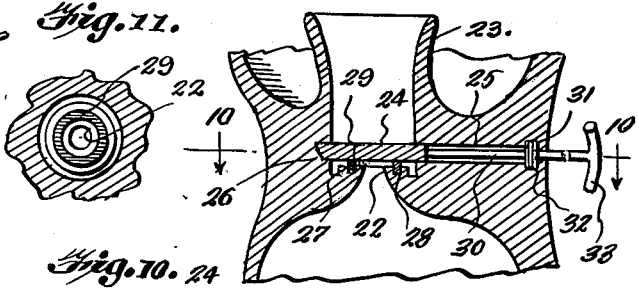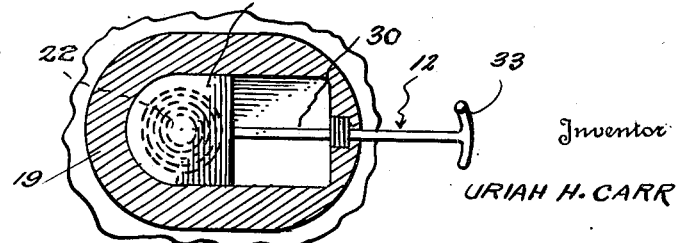

Patented Apr. 23, 1946

2,399,100

UNITED STATES PATENT OFFICE 2,399,100

LOW ALTITUDE PARACHUTE

Uriah H. Carr, Winston-Salem, N. C.

Application June 21, 1944, Serial No. 541,403

1 Claim. (Cl. 244—142)

This invention relates to an improved parachute construction.

An object of this invention is to provide an improved parachute construction and assembly which includes means whereby the parachute may be positively opened by the wearer so that the device may be used at either low or high altitudes with assurance that the parachute will positively open.

Another object of this invention is to provide a device of this kind which embodies the use of a pilot parachute extending from center of the main parachute, the pilot parachute serving as a means for pulling or ejecting the main parachute from the container.

Another object of this invention is to provide in a device of this kind a container having gas under pressure, preferably air, and including a valve adapted to be opened by the wearer, the air upon release from the container initially blowing the pilot parachute from the holder therefor, and subsequently blowing the main parachute from the holder.

A further object of this invention is to provide a device of this kind wherein the air receptacle is of such construction that it may be used as a float in the event that the wearer land in water or the like.

A further object of this invention is to provide an air receptacle which may be made out of any desired metal, such as copper beryllium or other suitable metal which is made bullet-proof by any suitable means.

A further object of this invention is to provide a combined parachute and opener therefor which may be released from the holder by the wearer in the event the holding straps are not immediately torn by the air pressure.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a detailed side elevation of an emergency parachute constructed according to an embodiment of this invention, showing the parachute open and applied.

Figure 2 is a fragmentary plan view of the receptacle for holding the parachute in folded position.

Figure 3 is a detailed side elevation of the device with the parachute folded.

Figure 4 is a detailed front elevation of the device.

Figure 5 is a detailed rear elevation, partly broken away and in section.

Figure 6 is a sectional view, taken on the line 6—6 of Figure 5.

Figure 7 is a sectional view, taken on the line 7—7 of Figure 5.

Figure 8 is a longitudinal section, partly in detail, taken substantially through the center of the device.

Figure 9 is a fragmentary sectional view, taken on the line 9—9, of Figure 8.

Figure 10 is a fragmentary sectional view, taken on the line 10—10, of Figure 9.

Figure 11 is a fragmentary sectional view, taken on the line 11—11 of Figure 9.

Figure 12 is a fragmentary sectional view, taken on the line 12—12, of Figure 10, and Figure 13 is a fragmentary sectional view of the air valve for filling the device.

Referring to the drawings, the numeral 15 designates generally a hollow body which is formed of a longitudinally curved front wall 16 and a similarly curved rear wall 17. A curved bottom wall 18 connects the lower ends of the walls 16 and 17 together, and a neck 19 extends upwardly from the upper end of the body 15. An upwardly opening parachute receptacle or holder 20 extends from the upper end of the neck 19, and is adapted to receive a parachute including a main parachute and a pilot parachute in folded position.

The body 15 has disposed between the front and rear walls thereof a plurality of intersecting or crossed bracing walls 21 which are perforated so that air or gas may readily pass through the entire body. The neck 19 is provided with a reduced opening 22 communicating with a nozzle 23 which extends upwardly into the bottom of the holder 20. A slide valve 24 is slidable in an opening 25 formed transversely in the neck 19, and is formed at its inner end with a beveled or rounded portion 26. The neck 19 is formed with an annular rib 27 having an annular groove 28 therein within which a sealing gasket 29 is positioned so that when the valve 24 is in closed position no air or gas may escape from the interior of the body 15 to the nozzle 23. A valve stem 30 is connected to the outer end of the valve 24, and is slidable through a sealing gasket or gland 31 which is positioned in a recess 32 formed in the neck 19. The outer end of the stem 30 is provided with a handle 33 so that the valve 24 may be manually moved to open position.

The body 15, at the lower portion thereof, has secured thereto a pressure gauge 34 so that the user of the device can readily determine whether the amount of pressure within the body 15 is sufficient to discharge the parachute from the holder 20. A spring pressed air valve 35 is carried by the rear wall 17, adjacent the lower portion thereof, and is adapted to be closed by means of a cap 36.

A main parachute 37, having guys 38, is adapted to be secured to the inner portion of the holder 20, the lower ends of the guys 28 being secured to loops 39 carried by the interior of the holder 20 about the base of the nozzle 23. The central upper portion of the parachute 37 is formed with an opening 40, and a pilot parachute 41 having guys 42 is connected to the main parachute 37 and extends from the central opening 40.

When the main and pilot parachutes are in folded position, they are releasably held in the holder 20 by means of a pair of crossed straps 43 and 44. The straps 43 are connected to loops 45 carried by the upper edge of the holder 20, and the straps 44 are connected to loops 46 carried by the upper edge of the holder 20. The straps 43 and 44, at a point adjacent their crossing or intersecting point, are provided with tear portions 47 and 48, respectively, and a tear strap 49 is looped about the crossing point of the straps 43 and 44 so that the user may pull strap 49 so as to break the two straps 43 and 44 and thereby provide for the release of the main and pilot parachutes and the discharge thereof from the holder by pressure from within the body 15. The forward side of the body 15 may have a cushioning element 50 secured thereto, which is adapted to engage the back of the user, and this cushioning element, if desired, may be of buoyant construction so as to assist the body 15 in maintaining the wearer afloat if the wearer should drop into a body of water.

In the use and operation of this device, the body 15 is strapped to the body of the wearer by means of straps 51 engaging loops 52 carried by the opposite side edges of the body 15. The interior of the body 15 is filled with gas, such as air or the like, the valve 24 being in closed position and the air or gas being discharged into the body 15 through the air valve 35. When the air or gas is of the desired pressure, as determined by the gauge 34, the user will be assured that opening of valve 24 will provide for the forcible discharge and opening of the main and pilot parachutes when desired.

In opening the main and pilot parachutes, strap 49 may be pulled so as to break straps 43 and 44, whereupon valve 24 may be pulled outwardly to open position by the handle 33. Release of the gas or air from the interior of body 15 will force the main and pilot parachutes outwardly of the holder and initially the pilot parachute 41 will open and the main parachute will open promptly thereafter.

What is claimed is:

In combination, a main parachute, a pilot parachute carried centrally of said main parachute, a cup-shaped holder for both of said parachutes, a receptacle for receiving air under pressure, a neck connecting said holder and receptacle and having a passage communicating said holder and receptacle, a valve intersecting said passage, an outwardly flared air nozzle in said holder adapted to project into the folds of said main parachute, said nozzle terminating within said holder and underlying said pilot parachute, and a pair of crossed frangible straps secured to said holder and engaging over said parachutes to normally hold the latter in the holder.

URIAH H. CARR.